United States Patent [19]

Ondracek

[11] Patent Number: 4,705,577
[45] Date of Patent: Nov. 10, 1987

[54] NUCLEAR FUEL ELEMENT CONTAINING LOW-ENRICHMENT URANIUM AND METHOD FOR PRODUCING SAME

[75] Inventor: Gerhard Ondracek, Linkenheim, Fed. Rep. of Germany

[73] Assignee: Kernforschungszentrum Karlsruhe GmbH, Karlsruhe, Fed. Rep. of Germany

[21] Appl. No.: 878,517

[22] Filed: Jun. 23, 1986

Related U.S. Application Data

[63] Continuation of Ser. No. 648,624, Sep. 10, 1984, abandoned, which is a continuation of Ser. No. 320,057, Nov. 10, 1981, abandoned.

[30] Foreign Application Priority Data

Nov. 11, 1980 [DE] Fed. Rep. of Germany ....... 3042424

[51] Int. Cl.$^4$ .................. G21C 3/28; G21C 3/36; C21D 1/00
[52] U.S. Cl. ................. 148/11.5 P; 148/127; 148/126.1; 148/132; 376/421; 376/432; 419/8
[58] Field of Search ............... 148/126.1, 132, 11.5 P, 148/127; 376/432,421; 75/122.7; 419/8

[56] References Cited

U.S. PATENT DOCUMENTS

| | | | |
|---|---|---|---|
| 2,917,383 | 12/1959 | Saller | 75/214 |
| 2,934,482 | 4/1960 | Brooks | 204/193.2 |
| 2,950,188 | 8/1960 | Picklesimer et al. | 376/422 |
| 2,967,141 | 1/1961 | Picklesimer et al. | 376/421 |
| 2,986,504 | 5/1961 | Goslee et al. | 376/432 |
| 3,020,222 | 2/1962 | Zambrow et al. | 376/432 |
| 3,029,198 | 4/1962 | Anderson et al. | 376/432 |
| 3,042,598 | 7/1962 | Crowther | 376/430 |
| 3,098,025 | 7/1963 | Noland et al. | 376/432 |
| 3,297,543 | 1/1967 | Jessen et al. | 376/432 |
| 3,331,748 | 7/1967 | Ferady | 376/422 |

OTHER PUBLICATIONS

Powder Metallurgy, vol. 14, 1970/71, pp. 289-297, Jessie et al.
Metals and Fuels (Progress in Nuclear Energy), vol. 1, 1956, pp. 535-543, Saller.
U.S. Atomic Energy Commission, Idaho Nuclear Corp., No. IB-1133, Dec. 1967, "The Development of Powdered Uranium–Aluminum Compounds for Use as Nuclear Reactor Fuels" by G. W. Gibson.
Journal of Nuclear Materials, vol. 37, 1970, pp. 340-342.
Journal of Nuclear Materials, vol. 56, 1975, pp. 251-259.
Powder Metallurgy, vol. 12, 1969, pp. 1-22.
Thummler et al, Powder Metallurgy, vol. 10, 1967, No. 20, pp. 264-287.
Gibson et al, Fall Meeting of the Metallurgical Society of A.I.M.E., Cleveland, Ohio, Oct. 20-24th, 1963, pp. 1-12.
Nazare et al, Kernforschungszentrum Karlsruhe Institute for Material and Solid Body Research, KFK Report 585, Apr. 1967, pp. 1, 7-12, and 19-22.
Nazare et al, Kernforschungszentrum Karlsruhe Institute for Material and Solid Body Research, Aug. 1970, pp. 1-79.
Jesse et al, Kernforschungszentrum Karlsruhe Institute for Material and Solid Body Research, Aug. 1969, pp. 1-45.
Dienst et al, Kernforschungszentrum Karlsruhe Institute for Material and Solid Body Study, Oct. 1975, pp. 1-38.

*Primary Examiner*—Harvey E. Behrend
*Attorney, Agent, or Firm*—Sughrue, Mion, Zinn, Macpeak and Seas

[57] ABSTRACT

A plate-shaped high power nuclear fuel element containing low enrichment uranium (5 to 20 percent by weight uranium$^{235}$ in the uranium component) as fissionable material, the fuel element essentially comprising a UAl$_4$ plate provided with an aluminum sheath or a sheath of an Al alloy and impurities inherent in the manufacturing process. A process for producing such a UAl$_4$ plate comprises (a) intimately mixing a powder of low enrichment uranium or uranium compound U$_6$Fe (5 to 20 percent by weight U$^{235}$) having a particle size in the range from 0.1$\mu$ to 90$\mu$ with aluminum powder having a particle size in the range from 0.1$\mu$ to 100$\mu$ in a weight ratio range of uranium to aluminum between 1.1 U:1 Al and 2.2 U:1 Al; (b) prepressing the mixture of step (a) at a pressure in the range from 300 MPa to 500 MPa and at room temperature to form a plate-shaped blank; (c) inserting the blank into an Al picture-frame or a picture-frame of an Al alloy and welding it to the frame in vacuo or inert gas argon; (d) rolling the picture-frame in three roll passes, a reduction in thickness of about 1 mm occurring in each of the first and second passes and a reduction in thickness by about 15% occurring during the third roll pass, at a temperature of 800°±25° K.; (e) inserting the plate in the frame after the third roll pass between two Mo sheets, inserting the framed plate together with the Mo sheets in a clamping device, and subsequently heat treating the plate at 800°±25° K. for a duration of at least 75 hours in order to form UAl$_4$ in the plate.

2 Claims, No Drawings

NUCLEAR FUEL ELEMENT CONTAINING LOW-ENRICHMENT URANIUM AND METHOD FOR PRODUCING SAME

This is a continuation of application Ser. No. 648,624, filed Sept. 10, 1984, now abandoned, which is a continuation of application Ser. No. 320,057, filed Nov. 10, 1981, now abandoned.

BACKGROUND OF THE INVENTION

The present invention relates to a plate-shaped, high power, nuclear fuel element containing low enrichment uranium (5 to 20 percent weight uranium$^{235}$ in the uranium component) as the fissionable material.

In order to prepare for the possibility that high enrichment uranium, which is used to produce nuclear fuel elements, will not be available in the future, atomic nuclear reactors must be re-equipped to operate with nuclear fuel elements containing low enrichment uranium. Such reactors, for example, are research reactors (including material testing reactors) whose particular significance is their use as a training system for power plant reactor personnel. To be able to perform such re-equipping sensibly and economically without too much expense, studies and tests have been made as to how to change from nuclear fuel elements with about 90 percent enrichment, i.e. 90% $U^{235}$ in the uranium component and about 0.4 to 1.3 g $U/cm^3$, to fuel elements containing low enrichment uranium, i.e. $\leq 20\%$ $U^{235}$ in the uranium component, without having to encounter too much of a reduction in power during operation of the reactor. Retaining the reactor power seems possible only if the reduction in enrichment from 90% to 20% $U^{235}$ is accomplished by correspondingly increasing the uranium density in the fuel material. It has been calculated that for lower power reactors (e.g. between 1 watt and 10 $KW_{th.}$), an uranium density in the fuel material up to 2.4 g $U/cm^3$ would have to be obtained, for medium power reactors an uranium density up to 3.3 g$U/cm^3$ would have to be obtained, and for high power reactors an uranium density up to 5.75 to 7.03 g $U/cm^3$, would have to be obtained.

Plate elements have been proposed for re-equipping atomic nuclear reactors with low enrichment uranium.

Uranium-aluminum alloys for fuel elements in plate shape and a process for manufacturing them are disclosed in German Pat. No. 1,118,471. This patent generally relates to the suppression of the formation of UAl$_4$ in uranium-aluminum alloys. For this purpose, up to 20 atom percent, with respect to the finished product, of an element from the group including Si, Ti, Ge, Zr, Sn, Pb, In, Tl, Fe, Nb and Ga are used as an additional component. The presence of more than 0.5 atom percent of any one of the above-mentioned ternary additional elements results in a UAl$_3$ concentration of more than 20 percent by weight and a UAl$_4$ concentration of less than 42 percent by weight. If the proportion of the additional elements is increased, the UAl$_4$ content is reduced. With the presence of more than 1.2 atom percent of a preferred additional element, an alloy is obtained whose UAl$_3$ concentration is more than 60 percent by weight and whose UAl$_4$ content is less than 8 percent by weight. The presence of 5 atom percent and more of the preferred silicon as an additional element leads to the complete suppression of UAl$_4$ and to an UAl$_3$ concentration of 65 percent by weight.

In the past, the most complete suppression as possible of UAl$_4$ formation in an uranium aluminide nuclear fuel element has been desired because the properties of the UAl$_4$ posed grave problems in the further processing of the nuclear fuel. For example, UAl$_4$ is hard and brittle, exhibits an orthorhombic lattice/and cannot be rolled into plates. If, as is customary and also disclosed in German Pat. No. 1,118,471, the uranium aluminide fuel material is produced by melting the uranium and aluminum components and pouring the melt into a mold to produce a cast shape or block, without using any additional (suppressing) elements, so much UAl$_4$ is formed during the subsequent hot rolling process that cracks appear in the fuel material. A uniform and homogeneous distribution of the uranium in the fuel materials, however, is one of the prerequisites for a properly operating nuclear fuel element.

Thus, it is impossible to initially produce UAl$_4$ by a melting or power technology and to then process it into nuclear fuel plates by means of the well-known picture frame technique (ref. Metals and Fuels, Vol. 1, 1956, pp. 535 to 543). UAl$_4$-preproduced either by melting or powder technology - can only be handled by picture frame technique in a mixture with Al powder up to an UAl$_4$ content of 20$^v$/o (due to rolling problems). But this concentration does not satisfy the nowadays demands ($\geq 2.4$ g $U/cm^3$ as discussed above see page 2, last line).

SUMMARY OF THE INVENTION

It is therefore an object of the present invention to provide a plate-shaped high power nuclear fuel element containing low enrichment uranium as the fissionable material to reestablish the availability of fissionable material for nuclear reactors and to provide a nuclear fuel element which, because of its characteristics, completely compensates for the drawbacks of the reduction from high enrichment fuel material (90% $U^{235}$ in the uranium component) to low enrichment fuel material (20% $U^{235}$ in the uranium component).

It is a further object of the invention to provide a method for producing such a plate-shaped high power nuclear fuel element containing low enrichment uranium.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects, and in accordance with its purpose, the present invention provides a plate-shaped high power nuclear fuel element containing low enrichment uranium (5 to 20 percent by weight uranium$^{235}$ in the uranium component) as the fissionable material, the fuel element essentially comprising a plate of UAl$_4$ provided with a sheath (clad) of aluminum or an aluminum alloy and impurities inherent to the manufacturing process.

In accordance with a further aspect of the present invention, a process is provided for producing the plate-shaped high power nuclear fuel elements according to the present invention by maintaining certain conditions to provide a plate-shaped high power nuclear fuel element with low enrichment uranium, the fuel element essentially comprising a UAl$_4$ plate provided with an aluminum sheath. Such a process according to the present invention for producing a plate of $UAl_4$ comprises:

(a) intimately mixing a powder of low enrichment uranium or uranium compound $U_6Fe$ (5 to 20 weight percent $U^{235}$) having a particle size in the range from $0.1/\mu$ to $90/\mu$ with aluminum powder having a particle size in the range from $0.1/\mu$ to $100/\mu$ in a weight ratio range of uranium to aluminum between 1.1 U:1 Al and 2.2 U:1 Al;

(b) prepressing the mixture of step a) at a pressure in the range from 300 MPa to 500 MPa at room temperature to form a plate-shaped blank;

(c) inserting the blank in an Al picture frame or a picture frame of an Al alloy and welding the blank to the frame in vacuo or inert gas argon;

(d) rolling the picture frame in three roll passes, a reduction in thickness of about 1 mm occurring in each of the 1st and 2nd passes, and a reduction in thickness by about 15% occurring during the third roll pass, at a temperature of $800°$ K.$\pm 25°$ K.;

(e) inserting the plate in the frame after the third roll pass between two Mo sheets, one Mo sheet being at the underside of the plate and the other Mo sheet being at the upper side of the plate, inserting the framed plate together with the Mo sheets in a clamping device, and subsequently heat treating the plate at $800° \pm 25°$ K. for a duration of at least 75 hours to form $UAl_4$ in the plate.

It is to be understood that both the foregoing general description and the following detailed description are exemplary, but are not restrictive of the invention.

DETAILED DESCRIPTION OF THE INVENTION

In the practice of the present invention, a powder mixture of aluminum and uranium or $U_6Fe$ compound is formed and prepressed into a plate-shaped blank. In the present invention additional elements other than uranium and aluminum (and iron alternatively) are not used to form the blank. The blank is then inserted into in an Al picture-frame or a picture-frame of an Al alloy in accordance with the well-known "picture-frame technique" to provide a jacket or cladding for the blank. The aluminum alloys can be those which are conventionally used as frame material in the picture frame technique. The blank is then welded to the frame in vacuo or inert gas argon and then rolled in three roll passes at a temperature of $800°$ K.$\pm 25°$ K.

It is possible to roll a powder mixture of uranium (or $U_6Fe$) and aluminum powder, as well as their first and second reaction products, i.e. $UAl_2$ or $UAl_3$, respectively. When the process according to the invention is practiced, the nuclear fuel plate is manufactured essentially before so much $UAl_4$ has been formed that rolling becomes impossible, but an Al or Al alloy sheathed plate is obtained after the subsequent heat treatment, which plate in the end has the high weight percentage of $UAl_4$ or practically pure $UAl_4$ as the so-called meat (that is, the nuclear fuel material within the frame and within the plate). In this way, the substitution of the Al matrix in the prior art $UAl_x$-Al dispersions by $UAl_4$ practically provides a way to completely compensate for the reduction in enrichment from 90 atom percent $U^{235}$ down to 20 atom percent $U^{235}$.

In $UAl_4$-Al dispersions (according to ref. Powder Metallurgy Vol. 14, 1970/71; pp. 289 to 297) it is practiced to have a continuous Al matrix phase in which the little $UAl_4$ particles have been embedded discontinuously. This prescription is made due to the rolling procedure, in which these Al matrix only guarantees the rollability. This is why any increase in $UAl_4$ content to compensate lower U enrichment is excluded, because it would lead to not acceptable rolling difficulties with respect to guaranteed clad thicknesses. percent $U^{235}$ down to 20 atom percent $U^{235}$. Since $UAl_4$ has a high rate of defects in the crystal lattice and there therefore exists a certain amount of room in the lattice for gaseous fission products, it is expected that a $UAl_4$ fuel element will exhibit little tendency to swell due to the formation of fission products during the lifetime of the fuel element in the nuclear reactor.

The stated minimum duration of 75 hours for the subsequent heat treatment assures conversion of the uranium and aluminum powder mixture into $UAl_4$ to more than 50 percent by weight the rest being $UAl_3$ mainly and a little $UAl_2$. The $UAl_4$ content before the heat treatment, formed during heat rolling is less than 30% by weight. This conversion is increased with increasing duration of this heat treatment and almost completed at about 150 h. However, since the $UAl_4$ formation continues during use of the fuel element in the reactor, the expansion of the heat treatment until there is complete conversion to $UAl_4$ is no longer absolutely necessary or significant for the process according to the present invention.

The significant advantages of a $UAl_4$ fuel plate can be seen in that the operating behavior under irradiation is relatively good, that the $UAl_4$ cannot react any longer with the aluminum sheaths because $UAl_4$ is stable with Al, and that during reprocessing of the spent fuel elements no problems are created by additional elements other than uranium and aluminum. Expansion of the volume of the fuel element plates or deformation of the plates during the lifetime of the fuel element in the reactor are substantially reduced by the $UAl_4$ fuel element.

The present invention will now be explained in detail with the aid of an example. However, the invention is not limited to this example.

EXAMPLE 7.6 g uranium powder having an average particle size of 30 $/\mu$ and 5.6 g aluminum powder having an average particle size of 50 $/\mu$ were mixed for more than an hour in a tumbling mixer equipped with plastic or ceramics inserts and rotating at 70 rpm. Due to the pyrophorosity of the U powder the work was performed in a gas purification box. The powder mixture was then pressed at 300 MPa and room temperature into a plate of 2.5 mm thickness. Thereafter, the pressed body was inserted into an Al frame together with Al bottom and cover foils (sheaths, each with a thickness of 2.4 mm) and was welded to the frame in vacuo in a welding box. Rolling took place in three passes, a reduction in thickness of 1 mm of the combination of plate, frame and foils was realized in each of the first and second passes and an additional reduction in thickness of 15% was realized in the third roll pass. Thereafter the thickness of the plate was 1.3 mm. The rolling temperature was near $800° \pm 25$ K., with the picture frame being heated for about 10 minutes before the first rolling pass. After the third rolling pass, the plate together with the frame was placed onto a sheet of molybdenum, was covered at its upper surface with a further sheet of molybdenum. In a steel clamping device the two molybdenum sheets were then fixed to the steel plate of the device and the said combination was subjected to a heat treatment of 800°±25 K. for 100 hours. Radiographs and glow images of the plate indicated a uniform and homogeneous macroscopic structure without the formation of macroscopic cracks or bubbles.

It will be understood that the above description of the present invention is susceptible to various modifications, changes, and adaptations, and the same are intended to be comprehended within the meaning and range of equivalents of appended claims.

What is claimed is:

1. Process for producing a plate-shaped high power nuclear fuel element containing lowenrichment uranium as fissionable material, the low-enrichment uranium containing 5 to 20 percent by weight uranium$^{235}$, the fuel element essentially comprising a UAl$_4$ plate provided with an aluminum sheath of an Al alloy and impurities inherent in the manufacturing process, comprising the following steps:

(a) intimately mixing (1) a powder of low enrichment uranium metal or uranium compound U$_6$Fe, with the uranium in the metal or compound being 5 to 20 percent by weight U$^{235}$, the powder having a particle size in the range from 0.1μ to 90μ with (2) aluminum powder having a particle size in the range from 0.1μ to 100μ in a weight ratio range of uranium to aluminum between 1.1 U:1 Al and 2.2 U:1 Al;

(b) prepressing the mixture in step a) at a pressure in the range from 300 MPa to 500 MPa at room temperature to form a plate;

(c) inserting said plate into an Al picture frame or a picture frame of an Al alloy and welding the plate to said frame in vacuo or inert gas argon;

(d) rolling the picture frame in three roll passes, a reduction in thickness of about 1 mm occurring in each of the first and second passes, and a reduction in thickness by about 15% occurring during the third pass, at a temperature of 800°±25° K.; and (e) inserting the plate in the frame after the third roll pass between two Mo sheets, one Mo sheet being at the underside of the plate, inserting the framed plate together with the Mo sheets in a clamping device, and subsequently heat treating the clamped plate at 800°±25° K. for a duration of at least 75 hours in order to form a plate consisting essentially of UAl$_4$ and other uranium-aluminum compounds and containing at least 50 weight % UAl$_4$ based on the weight of the plate.

2. Process according to claim 1, wherein in step (a) the low enrichment uranium is in the form of the uranium compound U$_6$Fe.

* * * * *